(12) United States Patent
Pais

(10) Patent No.: US 10,322,827 B2
(45) Date of Patent: Jun. 18, 2019

(54) HIGH FREQUENCY GRAVITATIONAL WAVE GENERATOR

(71) Applicant: Salvatore Cezar Pais, Callaway, MD (US)

(72) Inventor: Salvatore Cezar Pais, Callaway, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 383 days.

(21) Appl. No.: 15/431,823

(22) Filed: Feb. 14, 2017

(65) Prior Publication Data

US 2018/0229864 A1 Aug. 16, 2018

(51) Int. Cl.
| | |
|---|---|
| *B64G 1/40* | (2006.01) |
| *G01V 7/04* | (2006.01) |
| *H05H 3/04* | (2006.01) |
| *G01V 7/00* | (2006.01) |
| *H01J 61/16* | (2006.01) |
| *H05H 1/24* | (2006.01) |

(52) U.S. Cl.
CPC .............. *B64G 1/409* (2013.01); *G01V 7/005* (2013.01); *G01V 7/04* (2013.01); *H01J 61/16* (2013.01); *H05H 1/2475* (2013.01); *H05H 3/04* (2013.01); *G01V 7/00* (2013.01)

(58) Field of Classification Search
CPC .......... B64G 1/409; G01V 1/20; G01V 1/006; G21H 1/00

USPC .......................................................... 310/301
See application file for complete search history.

(56) References Cited

U.S. PATENT DOCUMENTS

| 6,002,644 A * | 12/1999 | Wilk ........................ G01S 7/521 367/88 |
| 2001/0006317 A1* | 7/2001 | Baker, Jr. .................. G21K 1/00 310/301 |
| 2007/0001541 A1* | 1/2007 | Baker, Jr. ............... B64G 1/409 310/301 |

OTHER PUBLICATIONS

Eardley, D. et al, High Frequency Gravitational Waves, Oct. 2008, McLean, Virginia.

(Continued)

*Primary Examiner* — Terrance L Kenerly
(74) *Attorney, Agent, or Firm* — Mark O. Glut; NAWCAD

(57) ABSTRACT

A high frequency gravitational wave generator including a gas filled shell with an outer shell surface, microwave emitters, sound generators, and acoustic vibration resonant gas-filled cavities. The outer shell surface is electrically charged and vibrated by the microwave emitters to generate a first electromagnetic field. The acoustic vibration resonant gas-filled cavities each have a cavity surface that can be electrically charged and vibrated by acoustic energy from the sound generators such that a second electromagnetic field is generated. The two acoustic vibration resonant gas-filled cavities are able to counter spin relative to each other to provide stability, and propagating gravitational field fluctuations are generated when the second electromagnetic field propagates through the first electromagnetic field.

5 Claims, 2 Drawing Sheets

(56) References Cited

OTHER PUBLICATIONS

Keimer, B. et al, High Temperature Superconductivity in the Cuprates.
Kivelson, S.A. and Spivak, B., Macroscopic Character of Composite High Temperature Superconducting Wires, Jul. 12, 2015.
Mitrano, M. et al, Possible Light-Induced Superconductivity in $K_3C_{60}$ at High Temperature, Nature, Feb. 25, 2016, vol. 530.
Pais, Salvatore, The High Energy Electromagnetic Field Generator, Int. J. Space Science and Engineering, 2015, vol. 3, No. 4, Inderscience Enterprises, Ltd.

* cited by examiner

HIGH FREQUENCY GRAVITATIONAL WAVE GENERATOR

STATEMENT OF GOVERNMENT INTEREST

The invention described herein may be manufactured and used by or for the Government of the United States of America for governmental purposes without payment of any royalties thereon or therefor.

BACKGROUND

On Feb. 11, 2016 the National Science Foundation publicly announced that the Laser Interferometry Gravitational Wave Observatory (LIGO) finally detected gravitational waves, thereby, showing that gravitational waves exist, further strengthening General Relativity (GR) theory predictions.

Gravitational waves can be seen as undulations in the structure of spacetime, or to be more exact, ripples in the curvature of the spacetime fabric. These waves are propagating fluctuations in gravitational fields, which arise due to the dynamics of massive physical entities. The source of gravitational waves may not be massive in nature, as long as its motion is represented by high frequency/high energy far from equilibrium dynamics. This can be observed from the energy-momentum tensor expression in the GR field equations.

Because of their physical nature (the graviton being a spin 2 particle), gravitational waves have the capability to penetrate solid matter at high frequency (HFGWs), moving at the speed of light. Furthermore, similar to electromagnetic waves, these gravitational waves (GWs) are carriers of energy and momentum. Moreover, GWs are transverse and quadrupolar in nature (stretching and squeezing space along their propagation path), and can be produced by accelerating asymmetric masses. The emission of high frequency gravitational waves denotes far-form-equilibrium phenomena.

Electromagnetic (EM) radiation (caused by accelerating electrically charged objects) when passed through a static magnetic field (of constant magnetic flux density) gives rise to gravitational waves at the same frequency as the EM radiation. This phenomenon is known as the Gertsenshtein Effect and can be utilized for a variety of applications ranging from advanced field propulsion (space drive), to communication through solid objects, as well as asteroid (planetoid) disruption and disintegration (when coupled with high energy electromagnetic field fluctuations).

In the language of quantum field theory, the Gertsenshtein Effect can be described as the mixing of a propagating photon with a graviton, via a Yukawa-type coupling mediated by a virtual photon from the background field.

The generation of high power high frequency gravitational waves (HFGWs) is just one application of the fundamental innovative principle behind this work, namely the enablement of macroscopic quantum coherence induced by controlled motion of charged matter, subjected to rapid acceleration transients. This principle can give rise to Emergent Physical Phenomena, such as, but not limited to Superconductivity.

Artificially generated high energy electromagnetic (EM) fields can interact strongly with the local Vacuum energy state (an aggregate/collective state comprised of the superposition of all fluctuations in the collective quantum fields permeating a given spacetime locality). According to quantum field theory, this strong interaction between the fields is based on the mechanism of transfer of vibrational energy between the fields, further inducing local fluctuations in adjacent quantum fields which permeate that spacetime locality (these fields may or may not be electromagnetic in nature).

Local Vacuum energy state can be seen as the collective energy state (structure) which contains the ground state of minimum energy (baseline fluctuations) that is the quantum vacuum, and the excited state of energy (induced fluctuations) generated by matter or any other source of energy in that spacetime locality. According to quantum field theory, matter, energy, and spacetime are emergent constructs which arise out of a foundational structure, which is the Vacuum energy state. Matter is confined energy, bound within fields, and may be thought of as a spectrum of different vibrational (and possibly gyrational) frequencies of the Vacuum energy state. The engineering of the Vacuum metastructure (since there are multiple Vacuum structures) has been discussed from a General Relativity perspective, and from a quantum field theory perspective. We are immersed in an ocean of energy (the Vacuum energy state), yet ordinarily we seem not to interact with it. This is because under normal circumstances (at or near equilibrium), the Vacuum state is homogeneous, isotropic, Lorentz invariant, in other words, it is symmetric. If this symmetry (far-from-equilibrium) is broken and strong interactions with the Vacuum energy state become possible, the manner in which the collective fields exchange energy with one another will be affected.

If we perform a "gedanken" (thought) experiment we can observe that the coupling of high frequency spin with high frequency vibration (especially for rapidly accelerated spin/vibration) of an electrically charged system (object) puts every point on the boundary of the object in a state of coherent superposition, thereby, inducing a macroscopic quantum phenomenon.

Furthermore, as observed from the Casimir effect, the boundary conditions of a physical system affect the local Vacuum energy state (VES) of that system (inclusive of zero point EM energy (QED) among other types of field energies (QCD, Higgs, etc.)), thereby, affecting the system's physical properties. Thus, by manipulating/modifying the boundary conditions of a physical system with respect to its local VES, we can alter the system's physical properties.

In a peer-reviewed paper by the inventor, entitled "The high energy electromagnetic field generator," published in the *International Journal of Space Science and Engineering*, Vol. 3, No. 4, 2015 pp. 312-317 (incorporated herein by reference and not admitted to be prior art), the inventor discusses the possibility of inertial (or gravitational) mass reduction using high energy electromagnetic (EM) fields, whereby, high frequency accelerated vibration and/or high frequency accelerated spin of electrically charged systems (minimally charged, if so desired) can lead to local vacuum state polarization (energy flux values in excess of $10^{33}$ W/m$^2$ are feasible, with corresponding energy densities in excess of $10^{25}$ J/m$^3$). In this manner, the local spacetime energy density is modified. These systems would be strategically placed on an intergalactic craft.

Craft mass reduction effects are achieved by control (coherence) of the collective quantum fluctuations in the Vacuum energy state in the immediate vicinity of the aerospace vehicle/spacecraft's electrified outer mold skin. As a result, extreme craft speeds can be achieved. This concept relates to an EM device which induces vibratory mass/energy fluctuations within a structure, which may or may not be solid in nature (thus generated plasma non-linearities can be considered).

An important realization (mathematically shown) of the peer-reviewed paper by the inventor is the fact that in an accelerated vibration and/or accelerated spin mode, the system's EM energy flux is amplified by a factor equivalent to the product of vibrational (or spin) angular frequency and the operational time of acceleration (namely the time for which the system is operated at maximum acceleration), with respect to the non-accelerated system's EM energy flux (showing the importance of an accelerated departure far from thermodynamic equilibrium).

The aerospace vehicle/space craft, discussed above, has the ability to control the accelerated modes of vibration and spin of the electrically charged surfaces. In particular, the rapid rates of change of accelerated-decelerated-accelerated vibration and/or accelerated-decelerated-accelerated gyration (axial spin) of the electrified surfaces can be controlled.

In this manner, we can delay the onset of relaxation to thermodynamic equilibrium (thereby delaying maximal entropy production), thus generating a physical mechanism which may induce anomalous effects (such as inertial or gravitational mass reduction). In this case, the system's EM energy flux is amplified by a factor equivalent to the square of the product of vibrational (or spin) angular frequency and the operational time of acceleration (time while system is at maximum acceleration), with respect to the non-accelerated system's EM energy flux.

A report written for the Office of the Director of National Intelligence (Defense Intelligence Agency), prepared by the MITRE Corporation in October 2008, under the title of "High Frequency Gravitational Waves," comes to the conclusion that current means and methods of producing HFGWs do not constitute a national security threat and in no shape or form can such physical entities be used for propulsion or communication of any sorts. This report is also referred to as the JASON report.

The JASON report considers relatively low EM energy fluxes, when compared with those generated by the physical mechanisms described in the inventor's aforementioned published paper (on the order of $10^{33}$ W/m$^2$, and beyond). This exceptionally high EM power intensity induces spontaneous particle pair production (avalanche) out of the vacuum of free space, thereby, ensuring complete polarization of the local Vacuum energy state, thus resulting in modification of the local spacetime energy density. It is because of this fact, that the JASON report's conclusions must be revisited, are incorrect, and are directly in conflict with the current invention.

SUMMARY

The present invention is directed to an high frequency gravitational wave generator (HFGWG) with the needs enumerated above and below.

The present invention is directed to a high frequency gravitational wave generator which includes a high frequency gravitational wave generator including a gas filled shell with an outer shell surface, microwave emitters, sound generators, and two acoustic vibration resonant gas-filled cavities. The outer shell surface is electrically charged and vibrated by the microwave emitters to generate a first electromagnetic field. The acoustic vibration resonant gas-filled cavities each have a cavity surface that can be electrically charged and vibrated by sound from the sound generators such that a second electromagnetic field is generated. The acoustic vibration resonant gas-filled cavities are able to counter spin relative to each other to provide stability, and propagating gravitational field fluctuations are generated when the second electromagnetic field propagates through the first electromagnetic field.

It is a feature of the present invention to provide a high frequency gravitational wave generator that can be used for advanced propulsion, asteroid disruption and/or deflection, and communications through solid objects.

It is a feature of the present invention to provide a high frequency gravitational wave generator which utilizes a means of enabling room temperature superconductivity in special composite metal wiring.

DRAWINGS

These and other features, aspects and advantages of the present invention will become better understood with reference to the following description and appended claims, and accompanying drawings wherein FIG. 1 is an embodiment of the high frequency gravitational wave generator;

DESCRIPTION

Figure 1:
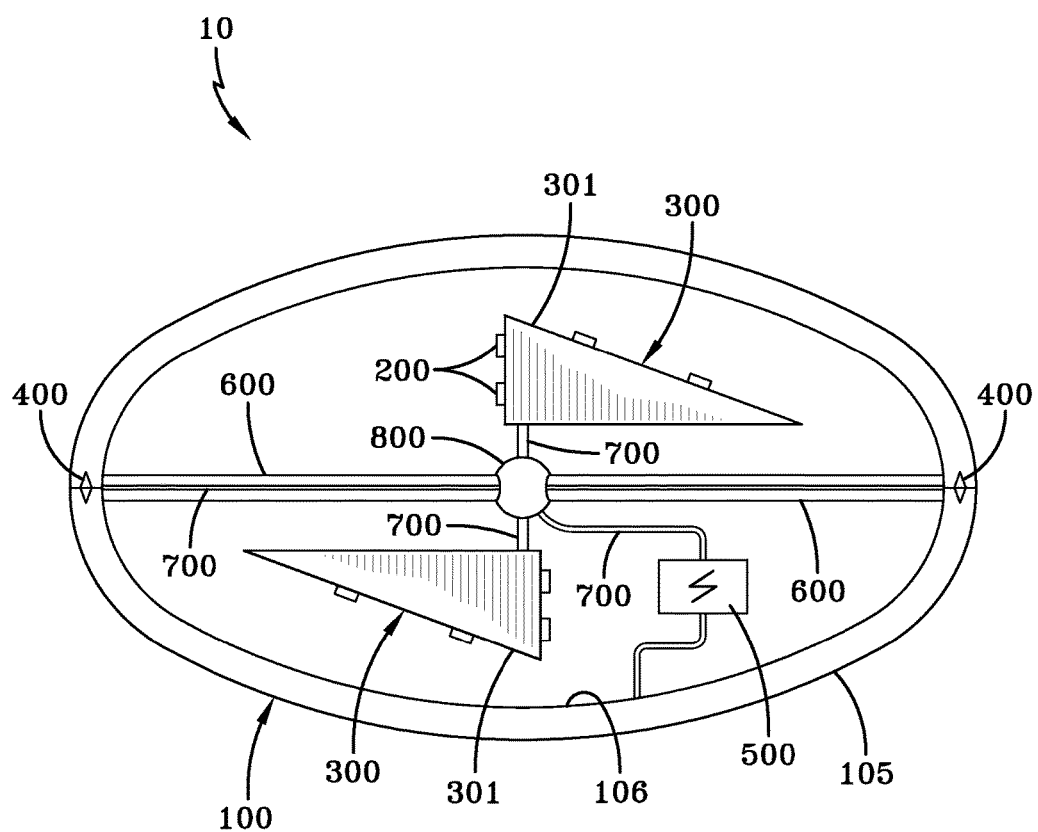

The preferred embodiments of the present invention are illustrated by way of example below and in FIGS. 1-3. As shown in FIG. 1, a high frequency gravitational wave generator 10 includes a gas filled shell 100, at least two sound generators 200 for generating sound, and two acoustic resonant gas-filled cavities 300. The gas-filled shell 100 includes microwave emitters 400 for generating an electromagnetic field. The gas filled shell 100 has an outer shell surface 105 and an inner shell surface 106. The outer shell surface 105 is able to be electrically charged by an electrical source 500 and is able to be vibrated by the microwave emitters 400, such that it generates a first electromagnetic field. The at least two sound generators 200 are disposed within the gas-filled shell 100. The two acoustic vibration resonant gas-filled cavities 300 are for propagation of sound created by the at least two sound generators 200. The two acoustic vibration resonant gas-filled cavities 300 are disposed within the shell 100 and each resonant gas-filled cavity 300 has at least one cavity surface 301 that can be electrically charged. The sound from the at least two sound generators 200 causes each of the electrically charged cavity surfaces 301 to vibrate such that a second electromagnetic field is generated. The two acoustic vibration resonant gas-filled cavities 300 are able to counter spin relative to each other to provide stability. An electrical motor and/or power plant 800 may provide motive power to counter spin the two acoustic vibration resonant gas-filled cavities 300. The electrical power source 500 may also provide power to the electrical motor and/or power plant 800. In the preferred embodiment, the electric source 500 and the electrical motor 800 are disposed between the two resonant gas-filled cavities 300. However, the electrical source 500 and the electrical motor 800 may be configured in any configuration practicable. A gravitational wave field is generated when the second electromagnetic field propagates through the first electromagnetic field.

In the description of the present invention, the invention will be discussed in a space, sea, or terrestrial environment; however, this invention can be utilized for any type of application that requires use of electromagnetic field generator.

Figure 2:
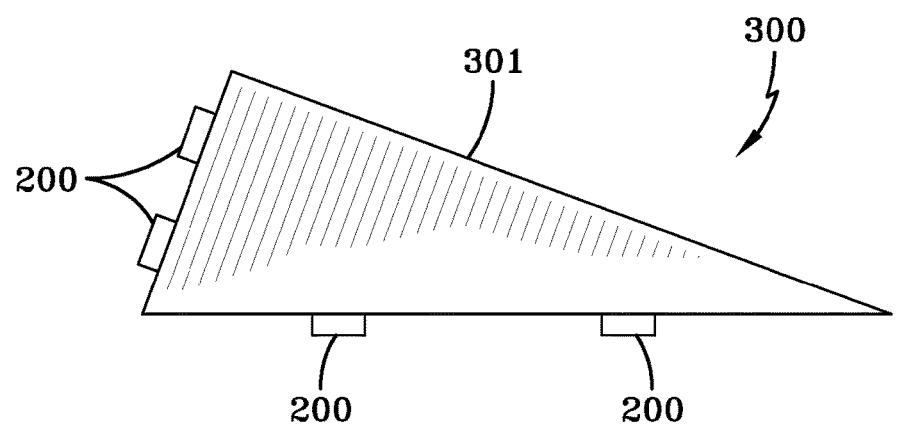
FIG. 2 is an embodiment of an acoustic vibration resonant cavity.

FIG. 2 shows one of the acoustic resonant gas-filled cavities 300. Each acoustic resonant gas-filled cavity 300 has at least one corresponding sound generator 200 and has an asymmetric incongruent wedge shape. As shown in FIG. 2, there may be multiple sound generators 200 corresponding to each acoustic resonant gas-filled cavity 300. The sound generators 200 may be configured in any manner that effectively causes the corresponding acoustic resonant gas-filled cavity 300 to vibrate or resonate. As a result of the vibration and electrical charge on its cavity surface 301, each acoustic resonant gas-filled cavity 300 generates a second electromagnetic field. Alternatively, instead of the acoustic resonant gas-filled cavities 300 we can use microwave energy resonant cavities to generate the second electromagnetic field, in a similar manner as the production of the first electromagnetic field.

As shown, in FIG. 1, the high frequency gravitational wave generator 10 may include a support structure 600 for mounting the elements of the invention and to support the two counter-spinning acoustic resonant gas-filled cavities 300. The high frequency gravitational wave generator 10 further may include wiring 700 to electrically charge the outer shell surface 105 and the cavity surfaces 301, to power the microwave emitters 400 and the sound generators 200. In the preferred embodiment the wiring 700 is room temperature superconducting wiring. FIG. 3 shows room temperature superconducting wiring configuration, described in further detail below.

As originally observed in the peer-reviewed paper described in paragraph 12, for conditions of accelerated vibration or accelerated spin of an electrically charged object/system, we can write for the maximum EM energy flux (time rate of change of EM energy transfer per unit surface area) the following equation:

$$S_{max} = f_G(\sigma^2/\varepsilon_0)[(R_v v^2)t_{op}]$$ (Equation 1), where $f_G$ is the charged system geometric shape factor (equal to 1 for a disc configuration), $\sigma$ is the surface charge density, $\varepsilon_0$ is the electrical permittivity of free space, $R_v$ is the vibration (harmonic oscillation) amplitude, $v$ is the angular frequency of vibration in Hertz (and similarly in the case of axial spin $R_v$ is the effective system radius, while $v$ represents the angular frequency of rotation), and $t_{op}$ is the operational time for which the electrically charged system is operated at maximum acceleration ($R_v v^2$). This closed form formulation is the result of the synthesis of classical electromagnetic field theory with the physics of simple harmonic motion.

Furthermore, for the case of rapid time rates of change of accelerated vibration/spin of the charged system (given that the time differential of acceleration is non-zero) we can re-write equation 1 as:

$$S_{max} = f_G(\sigma^2/\varepsilon_0)[(R_v v^3)t^2_{op}]$$ (Equation 2).

This demonstrates that, even with moderate vibrational/spin frequencies in a rapidly accelerating transient mode, the EM energy flux is greatly amplified.

Thus, if the product of all the controllable parameters in Equation 2 (other than the angular frequency of vibration) was of unit order, we can achieve energy flux values on the order of $10^{33}$ W/m² (endemic of the polarized vacuum energy state) with low end microwave frequencies on the order of $10^7$ Hz (inducing vibrations of a resonant cavity wall of equal or higher frequencies). This shows the extensive capabilities of a high energy/high frequency electromagnetic field generator.

Furthermore, if we consider adding to the equation representing simple harmonic motion of a vibrating mass, a 'momentum/energy-pumping' (negative damping) term {bv}, endemic of system acceleration, where b is a constant (>1) and v is {dx/dt}, namely the speed of a vibrating mass {m}, something extraordinary occurs, in that it can be shown that the total energy ($E_T$) of the vibrating system can be written as:

$$E_T = m\, R_v^2 \Omega^2 [\exp(2\Omega t)]$$ (Equation 3), where $\Omega$ is the angular frequency of vibration, under the condition that $\{(b/2m) \gg \Omega_0$ (natural frequency of vibration)$\}$. Since the EM energy flux is directly proportional to $E_T$, we observe that there will be exponential growth in energy flux with accelerating vibration for the aforementioned condition.

Referring to the JASON report described in paragraph 17, we note that enabling the Gertsenshtein effect will result in the generation of a gravitational wave (out) by passing an electromagnetic wave (in) through a strong static magnetic field (these waves are of equal frequency). By combining equations 3-13 and 3-14 on page 10 of the JASON report we obtain the following equation:

$$P_{GW(out)} = [(4\pi G/c^4)B_0^2 L^2] P_{EM(in)}$$ (Equation 4), where G is the universal gravitational constant, c is the speed of light in free space, $B_0$ is the magnetic flux density of the static magnetic field operating over a distance (L), and $P_{GW(out)}$ is the gravitational wave power achieved from an electromagnetic wave of power $P_{EM(in)}$. In the present invention, the Gertsenshtein effect is enabled by nested EM fields, in other words EM fields within EM fields.

It is important to note that a simple dimensional analysis shows that there is a factor missing in Equation 4, as written in the JASON Report, equal to the inverse of the magnetic permeability of free space, namely a factor on the order of $10^6$. Omitting this fact, however, we can still show that by using a high frequency/high energy electromagnetic field generator we can produce HFGW exhibiting power levels on the order of $10^{10}$ watts, for an input EM energy flux on the order of $10^{33}$ W/m². In this case, $B_0$ is the magnetic flux density, on the order of $10^{10}$ Tesla, which is also produced by means of controlled motion of charged matter subjected to rapid acceleration transients (by accelerated vibration).

Furthermore, by using equation 3-25 in the JASON report, we can show that such HFGW power levels are equivalent to $10^{35}$ gravitons/sec production rates. These extremely high graviton production rates further show that if multiple HF gravitational waves were to be focused on a particular point in a spacetime locality, they can induce a curvature singularity, namely a highly distorted and disrupted patch of spacetime structure.

The implications of colliding/focusing HFGWs generated by rapidly accelerated vibration/spin of electrically charged systems can be used in applications of propulsion as well as the extreme disruption of a planetary body (if so desired) since it can be shown that the energy level (gain in potential energy) capable of annihilating a planet such as the Earth is on the order of $10^{32}$ Joules (which may be achieved with the concept at hand; $E_{annihil} = (3/5)(GM_P^2/R_P)$; $M_P$ and $R_P$ are the planet mass and radius, respectively). Imagine a plurality of HFGWG devices (a minimum of four modules), aligned around a planetary body or planetoid (asteroid/comet) along a planar axis (four cardinal points). The emitted HFGWs would impinge on each other in such a manner as to severely disrupt the vacuum energy state at a spacetime locality denoting a point of impact (collision of gravitons with gravitons). At this disruption point, energy would be amplified to such a high degree as to generate a spacetime curvature singularity, leading to total destruction of the planetary body or planetoid (which can be an asteroid or comet on an impact trajectory with Earth).

Moreover, considering that gravitons are spin 2 particles, they will not couple with the fermions/electrons (spin ½) of solid ordinary matter (thus passing right through). Therefore, we can devise new methods of communication through solid objects. Proper engineering of the HFGWG can enable nuclear fusion energy generation, as well as give rise to Imaging Technologies, including deep earth penetrating capabilities such as surveillance for rare natural resources, etc. Additionally, the current invention may allow a spinning asymmetric quadra-polar configuration of a plurality of resonant cavities in which specially arranged microwave emitters produce the accelerated vibrations necessary to generate the HFGW effects.

As shown in FIG. 1, the high frequency gravitational wave generator 10 may include two counter-spinning acoustic resonant gas-filled cavities 300, whose axes of rotation are parallel to one another, and may be offset, to augment asymmetry. The acoustic resonant gas-filled cavities 300 can be filled with an inert or non-reactive gas, such as Helium, Neon, Argon, Xenon, which would be converted to plasma by acoustic or microwave energy, thus enhancing the far-from-equilibrium physics of this device, due to amplification of vibrational energy, under resonance conditions. In the preferred embodiment, the acoustic resonant gas-filled cavities 300 have the geometrical configuration of incongruent wedges, highly asymmetric in design, and can also be microwave resonant cavities.

The gas-filled shell 100, as well as other elements of the invention, may be constructed from cermet composite material and may further be doped with radioactive elements, such as Cobalt-57, Iron-57, or any other radioactive metal element that is practicable. High frequency vibrations of the doped shell will consequently induce the Mossbauer Effect, namely the recoilless emission of gamma rays. This phenomenon will further amplify the EM energy flux.

As described above, the high frequency gravitational wave generator 10 includes wiring 700 to electrically charge the outer shell surface 105 and the cavity surfaces 301, to power the microwave emitters and the sound generators. In the preferred embodiment, as shown in FIG. 3, the wiring 700 is room temperature superconducting (RTSC) wiring 900.

Internal heating within an enclosure can be greatly reduced by room temperature superconducting wiring 900, which would allow for lossless transmission of electrical power to its systems and subsystems. There are three parameters which affect superconductivity (SC), namely temperature, current density, and externally applied magnetic field strength. Physically, these parameters have in common one thing, namely the motion of electric charges (electrons). Control of this motion via vibration and/or spin of charged matter subjected to rapid acceleration transients (highly non-linear in nature) may lead to the achievement of room temperature superconductivity, especially if the charged matter is inhomogeneous. There are three characteristics that a material must possess in order to be superconductive, a state of matter which constitutes a macroscopic quantum phenomenon, thus occupying a unique place in condensed matter physics. These characteristics are perfect diamagnetism (the Meissner effect), perfect electrical conductivity (zero electrical resistance) and macroscopic quantum coherence, namely the ability of all the constituent particles in a superconductor to fall into lock step and move in an organized orderly fashion (in other words to form a giant matter wave).

The key to superconductivity may be the enablement of local macroscopic quantum coherence, namely the possible ability of a macroscopic object to act as if quantum mechanical in nature exhibiting such phenomena as superposition, entanglement, and/or tunneling. Possibly, the enablement of RTSC may have little to do with the SC material chemical structure and a great deal to do with what is done to the material to make it SC, from a far-from-equilibrium perspective (non-equilibrium thermodynamics). In order to make a special composite metal wire be superconductive (SC) at room temperature, one must make it abruptly vibrate, while running a steady current through it, just like 'plucking' a guitar string, intermittently. The special composite metal wire is composed of a bulk (core) insulator with a thin coating of a normal metal (such as Aluminum), of a thickness on the order of the London penetration depth, given an externally applied magnetic field. This could be termed an unconventional superconductor, given that the RTSC super-current may be generated along the interface (boundary) between the normal metal and the insulator portions of the wire, due to symmetry breaking.

Figure 3:
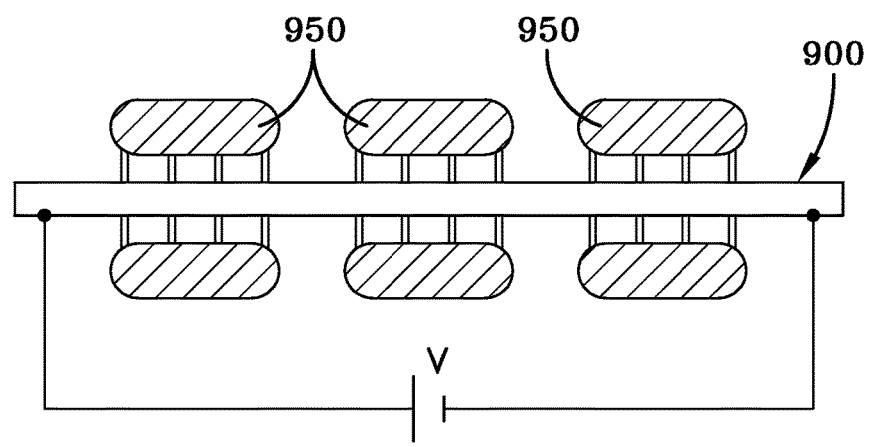
FIG. 3 is a cross-sectional view of an embodiment of the room temperature superconducting wiring configuration.

FIG. 3 shows the non-mechanical version of this idea, whereby the wiring 700 is room temperature super conducting wire 900, and is abruptly pulsed with electromagnetic (EM) radiation from electromagnetic radiation sources 950. The electromagnetic radiation sources 950 may be, but without limitation, optically pumped photo-diodes, microwave emitters, and/or Klystron tubes. In the preferred embodiment, room temperature superconducting wire 900 has a non-time dependent current running through it and the radiation sources 950 are annular, as shown in FIG. 3.

In a set-up where the room temperature super conducting wire 900 is surrounded by a plurality of annular ring shaped EM radiation sources 950 which irradiate the wire 900 in an abruptly and randomly pulsed manner, energy flux sources would be spaced out along the wire length, at experimentally optimized locations. The EM energy flux pulsing frequencies are in the microwave range of 300 MHz to 300 GHz, although other EM radiation spectrums (for example Terahertz regime) may be used.

The enablement of RTSC as presented herein is supported by a recently published paper—M. Mitrano et al. "Possible light-induced superconductivity in K3C60 at high temperature," *Nature* 530, 461-464 (25 Feb. 2016), which shows that "by exciting metallic K3C60 (potassium doped fullerene, a 'cousin' of graphene) with mid-infrared optical pulses, we induce a large increase in carrier mobility, accompanied by the opening of a gap in the optical conductivity." This shows the importance of non-equilibrium phenomena (abrupt departure far-from-equilibrium) in effecting high Tc superconductivity.

When introducing elements of the present invention or the preferred embodiment(s) thereof, the articles "a," "an," "the," and "said" are intended to mean there are one or more of the elements. The terms "comprising," "including," and "having" are intended to be inclusive and mean that there may be additional elements other than the listed elements.

Although the present invention has been described in considerable detail with reference to certain preferred embodiments thereof, other embodiments are possible. Therefore, the spirit and scope of the appended claims should not be limited to the description of the preferred embodiment(s) contained herein.

What is claimed is:

1. A high frequency gravitational wave generator comprising:
   a gas-filled shell, the gas-filled shell comprising of microwave emitters, the gas filled shell has an outer shell surface and an inner shell surface, the outer shell surface is able to be electrically charged by an electrical source and is able to be vibrated by the microwave emitters, such that it generates a first electromagnetic field;
   at least two sound generators for generating sound, the at least two sound generators disposed within the gas-filled shell;
   two acoustic vibration resonant gas-filled cavities for propagation of sound created by the at least two sound generators, the two acoustic vibration resonant gas-filled cavities are disposed within the gas-filled shell and each resonant gas-filled cavity has one cavity surface that can be electrically charged, the acoustic energy from the at least two sound generators causing each of the electrically charged cavity surfaces to vibrate such that a second electromagnetic field is generated; the two acoustic vibration resonant gas-filled cavities being able to counter spin relative to each other to provide stability, propagating gravitational field fluctuations are generated when the second electromagnetic field propagates through the first electromagnetic field.

2. The high frequency gravitational wave generator of claim 1, wherein the high frequency gravitational wave generator includes wiring to electrically charge the outer shell surface and the cavity surfaces, to power the microwave emitters and the sound generators, the wiring being room temperature superconducting wiring.

3. The high frequency gravitational wave generator of claim 1, wherein the gas-filled shell and the two acoustic vibration resonant gas-filled cavities are filled with an inert gas.

4. The high frequency gravitational wave generator of claim 3, wherein the gas-filled shell is filled with Xenon.

5. The high frequency gravitational wave generator of claim 1, wherein the acoustic resonant gas-filled cavities have the geometrical configuration of incongruent wedges.

* * * * *